United States Patent
Vincent

(10) Patent No.: US 8,801,493 B2
(45) Date of Patent: Aug. 12, 2014

(54) BEEHIVE

(76) Inventor: Richard Scott Vincent, Madison, WI (US)

(*) Notice: Subject to any disclaimer, the term of this patent is extended or adjusted under 35 U.S.C. 154(b) by 59 days.

(21) Appl. No.: 13/203,329

(22) PCT Filed: Feb. 25, 2010

(86) PCT No.: PCT/US2010/025344
§ 371 (c)(1),
(2), (4) Date: Aug. 25, 2011

(87) PCT Pub. No.: WO2010/099280
PCT Pub. Date: Sep. 2, 2010

(65) Prior Publication Data
US 2011/0312244 A1    Dec. 22, 2011

Related U.S. Application Data

(60) Provisional application No. 61/208,431, filed on Feb. 25, 2009.

(51) Int. Cl.
*A01K 47/00* (2006.01)
*A01K 47/02* (2006.01)

(52) U.S. Cl.
CPC .................................... *A01K 47/02* (2013.01)
USPC .................................. 449/26; 449/32; 449/34

(58) Field of Classification Search
USPC .......................... 449/3, 15, 26, 32, 33, 34, 50
See application file for complete search history.

(56) References Cited

U.S. PATENT DOCUMENTS

| | | | |
|---|---|---|---|
| 9,300 A | 10/1852 | Langstroth | |
| 39,622 A | 8/1863 | Andrus | |
| 80,587 A | 8/1868 | Bassett | |
| 120,885 A * | 11/1871 | Lewis | 449/17 |
| 122,990 A * | 1/1872 | Bucklin | 449/26 |
| 223,330 A | 1/1880 | Finley | |
| 507,070 A * | 10/1893 | Hines | 449/21 |
| 1,036,950 A | 8/1912 | Anthony | |
| 2,593,296 A * | 4/1952 | Green | 449/13 |
| 3,999,237 A | 12/1976 | Solomon | |
| 4,133,065 A * | 1/1979 | Hogg | 449/33 |
| 4,267,612 A * | 5/1981 | Watts et al. | 449/23 |
| 4,409,697 A | 10/1983 | Bouwens | |
| 4,443,904 A * | 4/1984 | van Muyden | 449/6 |
| 4,981,458 A | 1/1991 | Johnston | |
| 6,579,147 B1 * | 6/2003 | DeYoung | 449/15 |
| 2003/0027490 A1 | 2/2003 | Wilkinson | |

* cited by examiner

*Primary Examiner* — Rob Swiatek
*Assistant Examiner* — Lisa Tsang
(74) *Attorney, Agent, or Firm* — Craig A. Fieschko, Esq.; DeWitt Ross & Stevens S.C.

(57) ABSTRACT

A beehive includes a column of stacked boxes which open onto each other at their tops and bottoms, with the column bearing a cap at its top and a floor at its bottom. The boxes have access ports for ingress and egress of bees, and the column is suspended above the ground on a support post which bears a pivot such that the column can be tipped from a vertical orientation to a horizontal orientation for easy maintenance. Bars, frames, and/or screens may be hung within and atop the boxes to promote desired comb-building behaviors, with bees tending to build comb downwardly from higher boxes into lower boxes. At desired times, upper boxes bearing honey may be removed from the column and lower boxes bearing brood may be rotated to the top of the column so that the bees continuously propagate down the column.

19 Claims, 2 Drawing Sheets

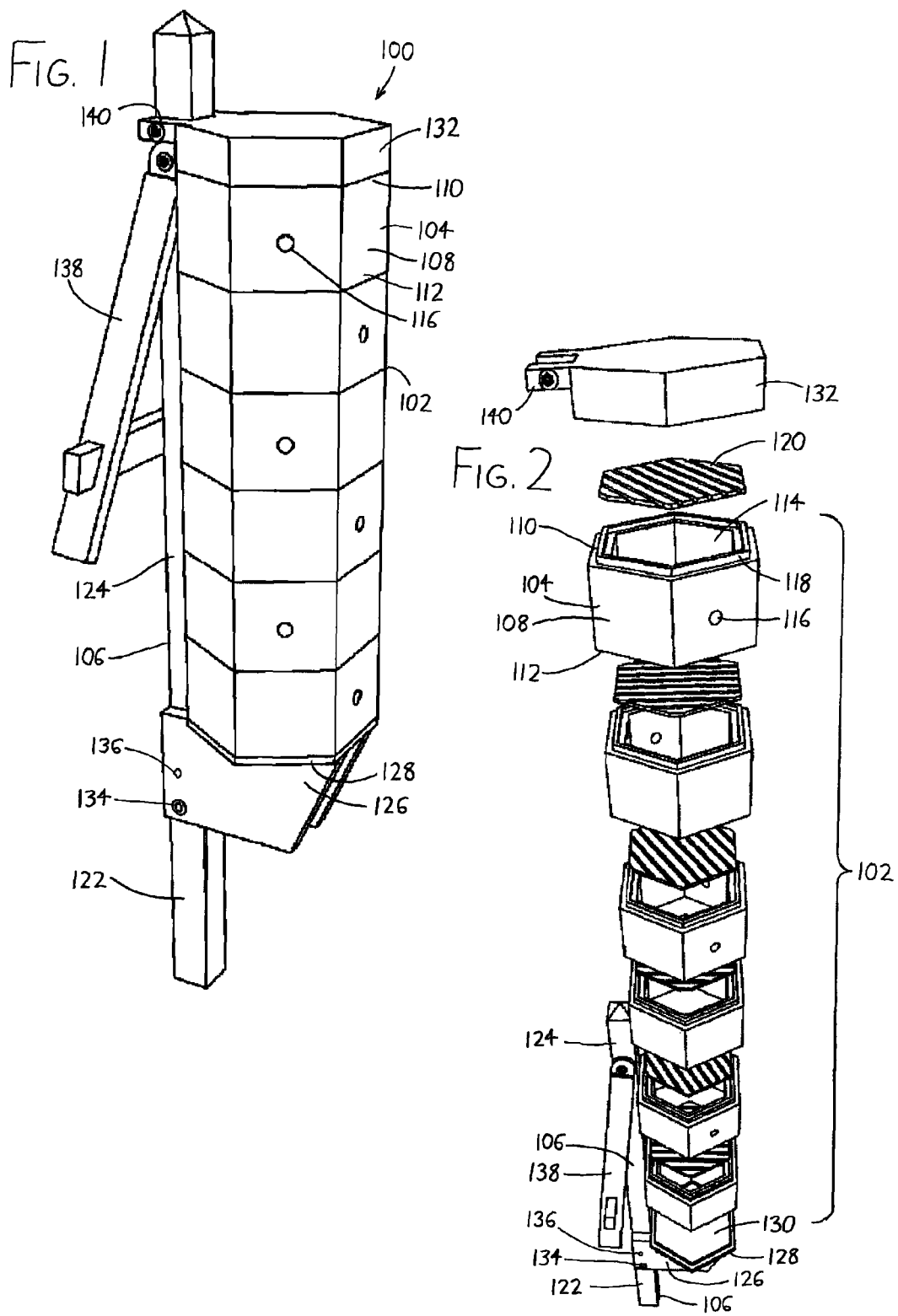

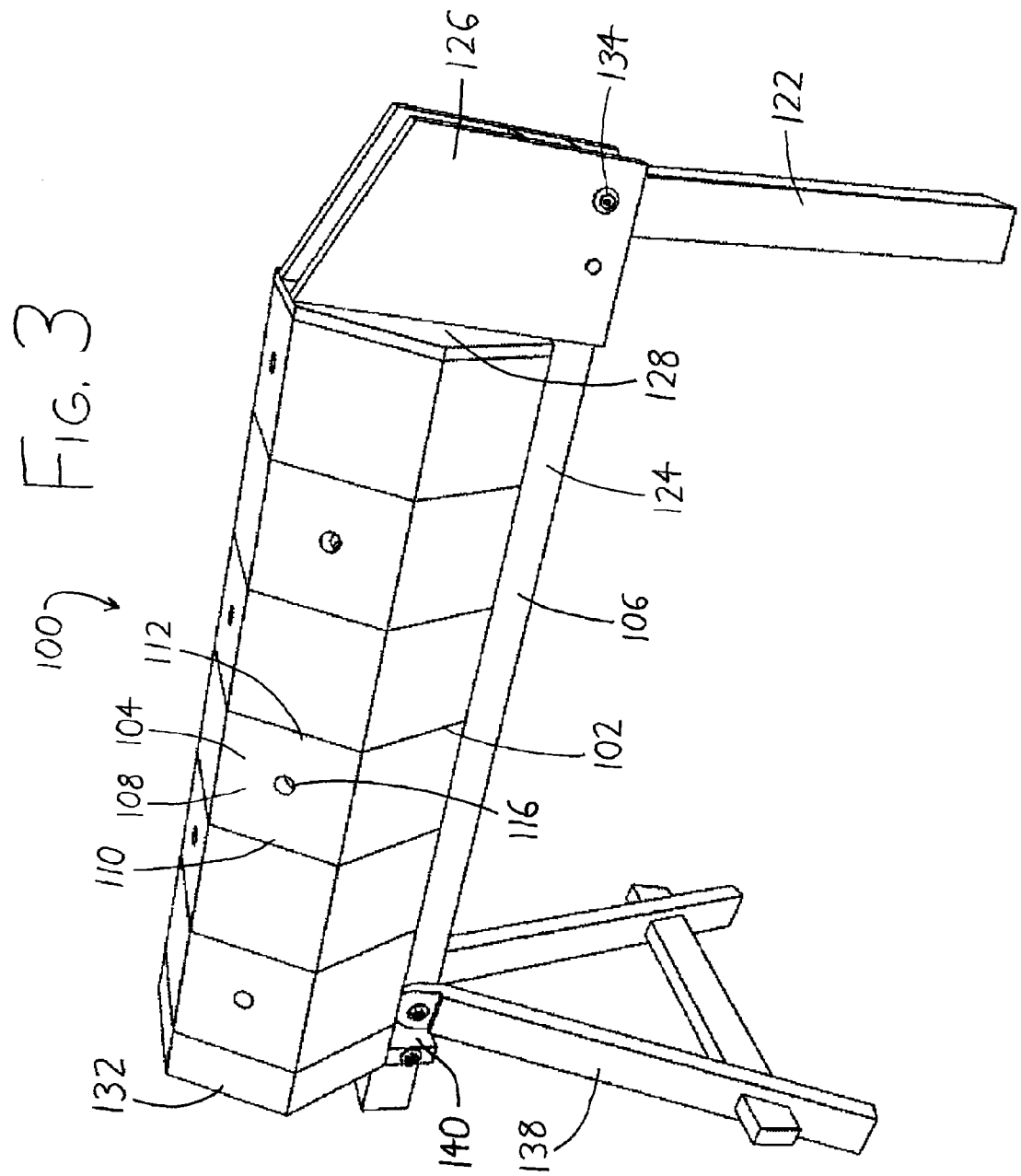

BEEHIVE

CROSS-REFERENCE TO RELATED APPLICATIONS

This application claims priority under 35 USC §119(e) to U.S. Provisional Patent Application 61/208,431 filed 25 Feb. 2009, the entirety of which is incorporated by reference herein.

FIELD OF THE INVENTION

This document concerns an invention relating generally to hives for insects such as bees and wasps, and more specifically to hives for honeybees.

BACKGROUND OF THE INVENTION

Beehives are commonly maintained to produce honey and/or to assist in the pollination of local crops. The great majority of hives used throughout North America, and indeed throughout the world, are based on the Langstroth hive (as seen in U.S. Pat. No. 9,300). In essence, the hive is a box, or a stack of boxes, which is usually set on the ground, and which has openings for ingress and egress of bees. Rectangular frames are hung within the boxes from near the box tops, and these are strategically spaced to promote bees' manufacture of combs within the frames. Frames can then be removed when desired to harvest the honey, or to move bees and larvae to new hives.

Beekeeping has unfortunately grown in difficulty in the last few years as parasites, diseases, and syndromes such as Colony Collapse Disorder (CCD) have spread. This has led to decreased honey yields, and greater difficulty in attaining the desired level of plant pollination. In many areas of the United States, it now takes significant maintenance and effort to keep hives healthy. This has unfortunately led to further declines in bee populations as beekeepers leave the field owing to the costs and difficulty involved. Thus, there is a significant need for hives and hive maintenance techniques which promote bee colony health and production.

SUMMARY OF PREFERRED VERSIONS OF THE INVENTION

The invention involves a beehive which is believed to provide the bees therein with better resistance to the foregoing problems, and better self-sustainability (e.g., ability to winter) with minimal maintenance. To give the reader a basic understanding of some of the advantageous features of the invention, following is a brief summary of preferred versions of the beehive, with reference being made to the accompanying drawings (which are briefly reviewed in the following "Brief Description of the Drawings" section of this document) to assist the reader's understanding. Since the following discussion is merely a summary, it should be understood that more details regarding the preferred versions may be found in the Detailed Description set forth elsewhere in this document. The claims set forth at the end of this document then define the various versions of the invention in which exclusive rights are secured.

Looking to FIG. 1 for a view of an exemplary version of the beehive (which is generally depicted by the reference numeral 100), a column 102 defined by a series of stacked boxes 104 is suspended above the ground by a support post 106. Each box 104 includes box sidewalls 108 extending between a box top 110 and an opposing box bottom 112 (both of which are preferably open), and surrounding a box interior 114 (seen in FIG. 2), with one or more access ports 116 extending through the sidewalls 108 to open onto the box interior 114 for bee ingress and egress. The sidewalls 108 are preferably numbered and configured such that each sidewall 108 is at a greater than 90 degree angle to an adjacent sidewall 108; thus, when the boxes 104 are configured with their sidewalls 108 defining a regular polygon, there are preferably at least five distinct sidewalls 108. This is believed to assist with ventilation of the hive 100, and to reduce mites and other intruders, which cannot as easily hide in shallower corners.

The sidewalls 108 are at least substantially aligned within the stack so that their box interiors 114 are aligned along a common path. Adjoining box tops 110 and box bottoms 112 are preferably designed such that they complementarily interfit, as by having tongues 118 at the box tops 110 (see FIG. 2) fit within mating grooves (not shown) in the box bottoms 112. As will be discussed in greater detail below, the boxes 104 within the column 102 are removable from the stack, and replaceable therein in different orders, so that (for example) boxes 104 containing honey can be removed, and boxes 104 containing brood can be moved up the column 102 with empty boxes 104 being placed below to allow more space for hive growth. Bars, frames, or other foundations for comb-building activities by bees can be hung or otherwise placed at the box tops 110, with FIG. 2 illustrating arrays 120 of bars fixed together in spaced relation (by small cross-connectors, not shown), and configured to fit atop the box 104 within the area bounded by the tongues 118. Barriers may alternatively or additionally be situated at the box tops 110, e.g., small-aperture screens for restricting the passage of bees to encourage swarming (and thereby promoting the nomination of a new queen, which may then proceed to regenerate the colony).

The support post 106 has a lower (base) length 122 and an opposing upper length 124, wherein the column 102 of stacked boxes 104 is arrayed along and supported by the upper length 124 in cantilever fashion above the base 122 (i.e., most, or preferably all, of the column 102 is situated on one side of the upper length 124 of the support post 106). The column 102 is therefore supported off the ground above the base 122 with most of the sidewalls 108 of the boxes 104 exposed, which is believed to provide better ventilation and humidity control. The upper length 124 of the support post 106 includes a lower ledge 126 which extends from the upper length 124, and which bears a column floor 128 upon which the lowermost box 104 in the stack rests to support the column 102. This column floor 128 preferably bears a tongue or other structure which complementarily interfits with the box bottom 112 of the lowermost box 104 (with the column floor 128 of FIG. 2 bearing a raised central surface 130 which complementarily interfits within the box interior 114 of the lowermost box 104). Farther up the upper length 124 of the support post 106, a column cap 132 extends outwardly to rest atop the column 102 of stacked boxes 104, and it preferably has a groove (not shown) or other structure which complementarily interfits with the box top 110 of the uppermost box 104. The column 102 of stacked boxes 104 is therefore sandwiched between the column floor 128 and the column cap 132, and the box sidewalls 108 of the boxes 104 within the column 102 are not connected to the support post 106 therebetween. One or both of the column cap 132 and the column floor 128 is removable from the support post 106 (as by unbolting and removing the support cap, see FIG. 2), whereby boxes 104 can be removed from and restacked within the column 102.

The upper length 124 of the support post 106, and thus the ledge 126, the column floor 128, and the column 102, are preferably pivotally connected with respect to the base (lower length) 122 of the support post 106, as by affixing the base 122 within the ledge 126 to pivot therein about a pivot bolt 134. (As best seen in FIG. 1, a removable locking pin/bolt 136 or other interfering structure can be used to deter pivoting when desired.) A particularly preferred arrangement, seen by comparing FIGS. 1 and 3, allows the upper support post length 124 to pivot between an at least substantially vertical orientation (FIG. 1), wherein the boxes 104 are in an at least substantially vertical array, and an orientation closer to horizontal (FIG. 3), wherein the boxes 104 are arrayed atop the upper length 124 of the support post 106 along a path which is more horizontal than vertical. As discussed below, this allows a beekeeper to more easily remove and restack the boxes 104 within the column 102. A stand 138 is pivotally affixed with respect to the column 102, preferably on the support post 106, wherein the stand 138 is pivotable away from the column 102 and the upper length 124 of the support post 106 into an at least substantially vertical orientation to support the column 102 and the upper length 124 of the support post 106 when they are in the orientation closer to horizontal (compare the stand 138 in FIGS. 1 and 3).

Following is a preferred method for using the hive 100 illustrated in FIGS. 1-3. A user may install the hive 100 at a desired location—e.g., at or near an orchard, or another location where bees are useful—and plant the base 122 of the support post 106 in the ground, or otherwise place the base 122 at a desired location (e.g., where the base 122 is configured with multiple legs or a platform so that it is freestanding, the hive 100 can simply be placed where desired). In the early spring, a starter colony, which may be purchased or taken from another hive, may then be installed within the stacked boxes 104, as by simply placing it within one of the upper boxes 104 (e.g., the uppermost box 104) atop the screen or bars 120 at its bottom. Since the height of the base 122 is preferably such that the lowermost box 104 is 1-6 feet off the ground, this is most easily done by pivoting the upper support post 124 and the column 102 into a horizontal position (or nearly so), as illustrated in FIG. 3. The column cap 132 may then be removed (as by unbolting the legs of a yoke 140 extending therefrom to allow removal of the yoke 140 and cap 132 from the upper length 124 of the support post 106), and two or more of the boxes 104 may be separated if desired, to access the interiors of the boxes 104.

The column 102 can then be tipped back to its vertical orientation, and the bee colony can be left to grow therein throughout the spring and summer, with the worker bees entering and leaving the boxes 104 via the access ports 116. Bees tend to start by building a comb at the uppermost box 104 (or one of the upper boxes 104), and they thereafter build comb downwardly, with the brood (i.e., eggs and larvae) near lower portions of the growing comb. When they encounter bars or a screen 120 between boxes 104, they simply travel through it and continue to build comb beneath it.

In the fall, if desired, one or more of the upper boxes 104 (which tend to be filled with honeycomb) can be removed to harvest the honey therein, again preferably after tipping the column 102 down. The boxes 104 beneath can be moved upwardly, with empty boxes 104 being installed at the bottom of the column 102 to replace any removed boxes 104. Leaving one or more boxes 104 filled with honeycomb over the winter helps to ensure that the colony has sufficient food and will resume activity the following spring. If one is not interested in harvesting the honey—e.g., where the primary goal of the hive 100 is to maintain a thriving colony for pollination purposes—the upper (honey) boxes 104 may be left in the column 102 during the winter, and need only be removed in the following year when the colony begins to outgrow the column 102 (e.g., when it begins filling the lowermost box 104).

In the spring, all or most of any upper boxes 104 bearing honeycomb are preferably removed, again preferably after tipping the column 102 down, and the lower (brood) boxes 104 may be moved to the top of the column 102. The colony will then tend to generate a new queen, which is believed to reinvigorate the colony, and will grow new comb within the space provided by the empty lower boxes 104 as the spring and summer months progress.

A particularly preferred approach for a six-box column 102 (as shown in the drawings) is to simply leave the hive 100 unmolested after installing the bees in the spring. In the following spring, the top four cells are removed and cleaned out (with the honey being harvested if desired), and then replacing the cleaned cells at the bottom of the column 102 after moving the lowermost two cells (with the queen and brood) to the top of the column 102. Preliminary testing has grown extremely large and thriving colonies, with annual installation and maintenance taking as little as 2-3 hours. The hive 100 therefore allows orchard owners and other growers to easily and economically maintain bees rather than using migratory hive installation and maintenance services, which tend to be more susceptible to the previously-noted problems with diseases and parasites, and to Colony Collapse Disorder (CCD).

Preliminary testing of the hive 100 using the methods noted above appears to indicate that it promotes healthier and more robust colonies than those in conventional hives, e.g., Langstroth hives, with less susceptibility to intruder species (e.g., Varroa "bloodsucker" mites, Acarine mites, hive beetles, wax moths, etc.), as well as foul brood disease and other disorders. As previously noted, the lack of perpendicular or "tight" corners about the inner circumferences of the boxes 104 is believed to reduce parasites and other intruders by providing smaller/lesser crevices in which intruders can hide, thereby allowing the colony to better defend against intruders. It is also believed to facilitate the generation of comb, and to assist with the colony's ability to control ventilation. Additionally, the suspension of the column 102 above the ground also deters raiding animals such as skunks, raccoons, bears, and the like, as well as intruders such as ants. Suspension of the column 102 above the ground also seems to provide better ventilation and humidity control, thereby allowing bees to conserve energy while curing (evaporating) nectar into honey (which ordinarily requires wing-fanning of the nectar), and while cooling or heating the brood nursery.

Further advantages, features, and objects of the invention will be apparent from the remainder of this document in conjunction with the associated drawings.

BRIEF DESCRIPTION OF THE DRAWINGS

FIG. 1 is a perspective view of a preferred version of the hive 100, showing the column 102 of stacked boxes 104 arrayed along the upper length 124 of the support post 106 above a base 122, and being supported thereon by the ledge 126, and with the column floor 128 and column cap 132 closing the ends of the column 102, with a stand 138 being pivotally connected to the upper length 124 of the support post 106.

FIG. 2 is a partially exploded (disassembled) view of the hive 100 of FIG. 1, showing the column cap 132 and boxes 104 removed from the upper length 124 of the support post 106 and "floating" above the ledge 126, and also showing comb-building bars 120 configured to fit between adjacent stacked boxes 104.

FIG. 3 is a perspective view of the hive 100 of FIG. 1 shown rotated about a pivot 134 between the upper length 124 of its support post 106 and its base 122 so that the column 102 is in a substantially horizontal orientation (with the stand 138 supporting the upper length 124 and the column 102), whereby the boxes 104 may be more easily removed, reordered, and restacked as desired by a beekeeper (after removal of the column cap 132, as shown in FIG. 2).

FURTHER DESCRIPTION OF PREFERRED VERSIONS OF THE INVENTION

It is emphasized that the discussion and drawings of this document merely depict exemplary versions of the invention, and the claims below—which define the scope of the invention—encompass versions of the hive which differ significantly. Following is a brief description of other exemplary versions.

Initially, the boxes 104 need not be polygonal, and could (for example) be round/cylindrical. They also need not be identical, and some boxes 104 may have different heights than others, or even different cross-sectional configurations (though this can make it difficult to mate the box tops 110 and box bottoms 112 without large gaps, unless adaptations are made to allow them to interfit). The interfitting relationship between adjacent boxes 104, while desirable, is not essential, and the interfitting structure can take forms other than tongue-and-groove arrangements (e.g., pegs, flanges, or other guides spaced about the top or bottom of a box 104 to allow it to receive the bottom or top of an adjacent box 104, latches or straps on the exterior walls of one box 104 that affix to the exterior walls of an adjacent box 104, etc.). The hive 100 need not have the number of boxes 104 shown in the drawings, but 3-6 boxes are preferred.

Different boxes 104 may also have different numbers and configurations of access ports 116, if they include access ports 116 at all. It is believed useful to include multiple access ports 116 spaced about the circumferences of the boxes 104, e.g., access ports 116 on every side (or every other side) of a polygonal box 104. This allows bees to choose and use those access ports 116 that they find most convenient to reach the portions of the hive 100 that they seek. Excess access ports 116 are usually not problematic, since bees will often plug unwanted access ports 116 with propolis, and unplug them when needed. Protrusions can be situated on the boxes 104 adjacent the access ports 116 to serve as "landing strips," which can ease ingress and egress by bees.

The base 122 and upper length 124 of the support post 106 need not be situated along common axes, and need not have similar structures. For example, the base 122 of the support post 106 could be a square post (as illustrated in the drawings), a round pipe, or even an environmental structure such as a lower length of a tree trunk, and it could rest directly below and/or alongside the footprint of the column 102. The upper length 124 of the support post 106 could be a plank, a metal plate, a concave frame wherein boxes 104 are received, or another structure pivotally affixed with respect to the base 122. In this respect, it should be understood that the term "support post" is not intended to limit the hive 100 to the use of a pole or beam, and rather a "support post" can assume practically any suitable structure which extends vertically, and which provides support for the column 102.

The stand 138 can also assume different forms, e.g., as a leg separate from the upper length 124 of the support post 106 which is installed after the column 102 is rotated towards a horizontal position. The stand 138 need not be provided at all if the rotated column 102 is supported in the horizontal orientation by the base 122 of the support post 106, or if a user will manually support the upper length 124 of the support post 106 and/or the column 102 (or otherwise let it rest on the ground).

While the invention is particularly intended for use with the raising/farming of honeybees, it can be used with other hiving insects as well, such as bumblebees and wasps.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A beehive including:
   a. two or more stacked boxes, each box having a box top and a box bottom with box sidewalls extending therebetween, with the box sidewalls:
      (1) defining an inner box circumference surrounding a box interior;
      (2) being at least substantially aligned within the stacked boxes; and
      (3) having one or more access ports therein opening onto the box interior, with the stacked boxes collectively defining a column wherein each of the boxes is removable and restackable within the column, whereby an order of the stacked boxes within the column may be varied; and
   b. a support post having a lower length and an opposing upper length, wherein:
      (1) the lowermost box in the column is supported along the upper length in cantilever fashion, with all or most of the column being situated on one side of a support post axis extending along the support post's lower length and upper length; and
      (2) the column is pivotally mounted with respect to the lower length to pivot the column between an at least substantially vertical orientation and an orientation closer to a horizontal orientation than to a vertical orientation.

2. The beehive of claim 1 further including a stand pivotally affixed with respect to the column, wherein the stand is pivotable away from the column:
   a. along a plane coincident with the support post, ledge, and column, and
   b. into an at least substantially vertical orientation,
   when the column is in the orientation closer to horizontal.

3. The beehive of claim 1 wherein each box has at least one of:
   a. a box top complementarily interfit with a box bottom of an adjacent stacked box, and
   b. a box bottom complementarily interfit with a box top of an adjacent stacked box, when the boxes are both stacked and restacked.

4. The beehive of claim 1 wherein the inner box circumference follows a path wherein any angles between box sidewalls along the path are greater than 90 degrees.

5. The beehive of claim 1 wherein each box has at least five distinct sidewalls.

6. A beehive including:
   a. two or more stacked boxes, each box having a box top and a box bottom with box sidewalls extending therebetween, with the box sidewalls:
      (1) defining an inner box circumference surrounding a box interior;
      (2) being at least substantially aligned within the stacked boxes; and (3) having one or more access ports therein opening onto the box interior, with the stacked boxes collectively defining a column wherein each of the boxes is removable and restackable within the column, whereby an order of the stacked boxes within the column may be varied; and b. a support post having a lower length and an opposing upper length, wherein:
(1) the column is supported along the upper length above the lower length,
(2) the support post includes a lower ledge extending therefrom upon which the column of stacked boxes rests, and
(3) the boxes within the column are not connected to the support post at their box sidewalls, wherein the ledge and the upper length of the support post are pivotally mounted to the lower length of the support post, whereby the column may be pivoted between an at least substantially vertical orientation and an orientation closer to a horizontal orientation than to a vertical orientation.

7. The beehive of claim 6 wherein the support post further includes a cap extending therefrom, the cap resting atop the column of stacked boxes.

8. The beehive of claim 7 wherein:
a. the cap is removable from the support post, whereby boxes can be removed and restacked within the column; and
b. the ledge and the upper length of the support post are pivotally mounted to the lower length of the support post, whereby the column may be pivoted between an at least substantially vertical orientation and an orientation closer to a horizontal orientation than to a vertical orientation.

9. The beehive of claim 6 wherein the column is pivotally mounted with respect to the support post, whereby the column may be pivoted between an at least substantially vertical orientation and an orientation closer to a horizontal orientation than to a vertical orientation.

10. The beehive of claim 9 wherein the column, when pivoting from the at least substantially vertical orientation to the orientation closer to horizontal, rests atop the support post.

11. A beehive including:
a. two or more stacked boxes, each box having a box top and a box bottom with box sidewalls extending therebetween, with the box sidewalls:
(1) defining an inner box circumference surrounding a box interior;
(2) being at least substantially aligned within the stacked boxes; and
(3) having one or more access ports therein opening onto the box interior, with the stacked boxes collectively defining a column wherein each of the boxes is removable and restackable within the column, whereby an order of the stacked boxes within the column may be varied; and b. a support post having a lower length and an upper length, wherein:
(1) the column is supported along the upper length above the lower length; and
(2) the stacked boxes are arrayed along the upper length of the support post; and c. a stand pivotally mounted to the upper length, wherein the stand is pivotable away from the upper length and the stacked boxes in a plane coincident with the upper length and the stacked boxes.

12. The beehive of claim 11 wherein the upper length is pivotally mounted with respect to the support post, whereby:
a. the upper length may be pivoted with respect to the lower length to pivot the column of stacked boxes between an at least substantially vertical orientation and an orientation closer to a horizontal orientation than to a vertical orientation, and
b. the stand may thereafter be pivoted away from the upper length into an at least substantially vertical orientation.

13. A beehive including:
a. a stack of boxes wherein:
(1) each box has a box top and a box bottom with box sidewalls extending therebetween, the box sidewalls including one or more access ports opening onto a box interior;
(2) the box tops and box bottoms of the boxes are oriented in at least substantially parallel planes;
(3) the box tops and box bottoms of adjoining boxes within the stack are complementarily interfit;
(4) the boxes within the stack are removable from the stack, and replaceable therein in different orders; and b. an elongated support post supporting the stack of boxes above the ground, wherein:
(1) the support post includes:
i) an upper length along which the boxes are situated; and
ii) a lower length to which the upper length is pivotally affixed, and
(2) the stack of boxes is pivotally mounted with respect to the lower length to pivot between:
i) an at least substantially vertical orientation, wherein the boxes are in an at least substantially vertical array, and
ii) an orientation closer to horizontal, wherein the boxes are arrayed along a path which is more horizontal than vertical.

14. The beehive of claim 13 wherein:
a. the boxes are affixed to the upper length of the support post at:
(1) the box top of an uppermost box in the stack, and
(2) the box bottom of a lowermost box in the stack; and
b. the boxes are not affixed to the upper length at their sidewalls.

15. The beehive of claim 13 wherein the upper length of the support post includes:
a. a lower ledge extending therefrom, wherein the stack of boxes rest upon the lower ledge; and
b. a cap extending therefrom, wherein the cap rests atop the stack of boxes.

16. The beehive of claim 13 wherein the boxes are not connected to the support post at their box sidewalls.

17. The beehive of claim 13:
a. wherein the stacked boxes are arrayed along the upper length of the support post; and
b. further including a stand pivotally mounted to the upper length, wherein the stand has a length which is pivotable away from the upper length and the stacked boxes to descend from the upper length when the stacked boxes are pivoted into the orientation closer to horizontal.

18. A beehive including:
a. two or more stacked boxes wherein:
(1) each box has at least one of:
(a) a box top complementarily interfit with a box bottom of an adjacent stacked box, and
(b) a box bottom complementarily interfit with a box top of an adjacent stacked box, with the box's box top situated above the box's box bottom;

wherein the box top and box bottom of each box are aligned along at least substantially parallel planes;

(2) boxes within the stack are removable and restackable in different orders, wherein after any such removal and restacking, each removed and restacked box has:
   (a) at least one of:
      i. the removed and restacked box's box top complementarily interfit with a box bottom of an adjacent removed and restacked box, and
      ii. the removed and restacked box's box bottom complementarily interfit with a box top of an adjacent removed and restacked box,
   (b) the removed and restacked box's box top situated above its box bottom;
(3) the stacked boxes have box interiors aligned along a common path; and
(4) each box includes one or more access ports between its box top and box bottom, each access port opening onto the box interior; and b. an elongated support post wherein:
   (1) the stacked boxes are arrayed along the length of the support post, and
   (2) the support post is pivotally connected with respect to a base, wherein the support post is pivotable between an at least substantially vertical orientation and an orientation closer to a horizontal orientation than to a vertical orientation, with the stacked boxes traveling therewith.

19. The beehive of claim 18 wherein the stacked boxes rest above one side of the base to extend therefrom in cantilever fashion.

* * * * *